United States Patent
Liem et al.

(10) Patent No.: US 9,588,756 B2
(45) Date of Patent: Mar. 7, 2017

(54) UPDATING SOFTWARE COMPONENTS IN A PROGRAM

(75) Inventors: Clifford Liem, Ottawa (CA); Hongrui Dong, Ottawa (CA); Sam Martin, Bellevue, WA (US); Yuan Xiang Gu, Ottawa (CA); Michael Weiner, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 236 days.

(21) Appl. No.: 14/387,215

(22) PCT Filed: Mar. 22, 2012

(86) PCT No.: PCT/CA2012/000307
§ 371 (c)(1),
(2), (4) Date: Jan. 5, 2015

(87) PCT Pub. No.: WO2013/138895
PCT Pub. Date: Sep. 26, 2013

(65) Prior Publication Data
US 2015/0113518 A1    Apr. 23, 2015

(51) Int. Cl.
*G06F 9/44*     (2006.01)
*G06F 9/445*    (2006.01)
*G06F 21/57*    (2013.01)

(52) U.S. Cl.
CPC ............... *G06F 8/65* (2013.01); *G06F 8/67* (2013.01); *G06F 21/57* (2013.01); *G06F 21/572* (2013.01); *G06F 8/68* (2013.01); *G06F 9/44521* (2013.01)

(58) Field of Classification Search
CPC ..... G06F 8/65; G06F 8/67; G06F 8/68; G06F 9/44521; G06F 21/57; G06F 21/572; H04L 63/1416
(Continued)

(56) References Cited

U.S. PATENT DOCUMENTS 6,128,773 A * 10/2000 Snider .......................... 717/132
6,842,862 B2    1/2005 Chow et al.
(Continued)

OTHER PUBLICATIONS

International Search Report and Written Opinion in corresponding International Application No. PCT/CA2012/000307 dated Dec. 14, 2012.
(Continued)

*Primary Examiner* — Qing Chen
(74) *Attorney, Agent, or Firm* — Marc S. Kaufman; Amardeep S. Grewal; Reed Smith LLP (57) ABSTRACT

A method and system for renewing software at the component-level is provided. A client program includes a base component for loading a software component into at least one loadable region of the program to update the program. Code in the software component is for writing state data associating the state of the update in storage, upon execution of the software component, and testing the state data to verify condition of the updated program and disallowing rollback and roll-forward attacks, the state data comprising hash chain values. The state data for verifying the correctness of the updated program is entangled with application data used for the program functionality. A server includes: an update pool having a plurality of software updates deployed in each client, and a policy control for monitoring and controlling at least one of: the length of time the client runs until the software update is invoked, a chain of the updates; and the granularity of the update.

51 Claims, 7 Drawing Sheets

Entanglement of State and Application Data (58) Field of Classification Search
USPC .............................. 717/168–178; 726/22–25
See application file for complete search history.

(56) References Cited

U.S. PATENT DOCUMENTS

| | | | |
|---|---|---|---|
| 7,397,916 B2* | 7/2008 | Johnson et al. | 380/28 |
| 7,496,910 B2* | 2/2009 | Voskuil | 717/168 |
| 7,562,214 B2* | 7/2009 | Riordan | 713/164 |
| 7,818,736 B2* | 10/2010 | Appavoo et al. | 717/168 |
| 7,934,210 B1* | 4/2011 | Stampfli et al. | 717/168 |
| 2003/0191870 A1* | 10/2003 | Duggan | 709/331 |
| 2003/0221121 A1* | 11/2003 | Chow et al. | 713/200 |
| 2004/0139340 A1 | 7/2004 | Johnson et al. | |
| 2005/0022026 A1 | 1/2005 | Riordan | |
| 2005/0132349 A1 | 6/2005 | Roberts et al. | |
| 2005/0262076 A1* | 11/2005 | Voskuil | 707/8 |
| 2006/0265704 A1* | 11/2006 | Holt | 717/169 |
| 2007/0061372 A1* | 3/2007 | Appavoo et al. | 707/200 |
| 2008/0022380 A1 | 1/2008 | Lu et al. | |
| 2009/0259999 A1* | 10/2009 | Srinivasan | 717/170 |
| 2011/0154299 A1* | 6/2011 | Kim et al. | 717/130 |
| 2012/0030758 A1 | 2/2012 | Van Den Berg et al. | |

OTHER PUBLICATIONS

Extended European Search Report in European Application No. 12871704.8 dated Oct. 15, 2015.

* cited by examiner

FIG. 1: Base Mechanism

FIG. 2: Renewable System from a Client View

FIG. 3: Renewable System from a Server View

FIG.4: Diversity applied to Modules

FIG. 5

FIG. 6: Hash Chains Calculating Sentinel Values for Forced Updates

FIG.7: Entanglement of State and Application Data

UPDATING SOFTWARE COMPONENTS IN A PROGRAM

RELATED APPLICATION DATA

This application is the National Stage of International Patent Application No. PCT/CA2012/000307, filed Mar. 22, 2012, the disclosure of which is hereby incorporated by reference in its entirety.

FIELD OF INVENTION

The present invention relates to a method and system for programming components, and more specifically to a method and system for updating software components in a program.

BACKGROUND OF THE INVENTION

Updating software in the field typically takes on a few different approaches. One approach requires that the full program is updated at any renewal. While the advantage of this approach is that any part of the program may be changed at any renewal, it bears the disadvantage of requiring a sizable amount of upload data and code.

A second approach of updatability involves relegating functionality to be data driven, so that data files control paths of control-flow. While this approach does allow behaviour to be changed at run-time, it requires decisions to be built into the software up-front and can cause the renewability aspect of the approach to be limited, especially for the purposes of protecting the code from being attacked.

A third approach uses the availability of dynamic or shared library mechanisms for updating a set of components. While useful, this approach has the disadvantage of requiring a dynamic linking phase to resolve relocatable symbols at run-time giving a performance overhead resulting in the approach being typically used sparingly for a handful of components. Furthermore, the granularity of what functionality lies within the dynamic library is fairly rigid with regards to the overall system. Moreover, certain platforms do not support dynamic linking.

Current methods for dynamically updatable software components are coarsely-granular, slow, or limited in the code and data that may be updated. Additionally, some methods require the software to not be running while taking an update. Those methods that can load updates while running suffer from coarse-granularity and an inability to predict a high confidence level when loading an update dynamically. Furthermore, the ability of updating software components for the purposes of renewing the security as a response to a breach, or as a forerunner to any perceived attack is not well supported. The existing methods for updatable software have been driven by functional updates and responses to defects in fielded products.

Security problems in existing updatable software component mechanisms include an attacker's ability to prevent taking new updates and rolling back to previous updates. Furthermore, the attacker has the ability to gain a lot of information by looking at differences in software component updates. The differential attack can be mounted between software component updates and between different user installations.

SUMMARY OF THE INVENTION

It is an object of the invention to provide a method and system that obviates or mitigates at least one of the disadvantages of existing systems.

According to an aspect of the present disclosure, there is provided a method for software renewal, which includes: loading a software component into at least one loadable region of a program by a base component in the program to update the program, the software component being dynamically swapped at run-time of the program in accordance with an update schedule, writing state data associating the state of the update in a storage, upon execution of the software component; testing the state data to verify condition of the updated program, the state data comprising hash chain values; and entangling the state data for verifying the correctness of the updated program with application data used for the program functionality.

According to a further aspect of the present disclosure, there is provided a system for renewing software, which includes: a client including: a processor, and a memory for storing a program including a base loading component for loading a program component into at least one loadable region of the program to update the program, the program component being dynamically swapped at run-time of the program in accordance with an update schedule, the program component having code for writing state data associating the state of the update in a storage, upon execution of the software component, and testing the state data to verify the condition of the updated program, the state data comprising hash chain values, the state data for verifying the correctness of the updated program being entangled with application data used for the program functionality.

BRIEF DESCRIPTION OF THE DRAWINGS

These and other features of the invention will become more apparent from the following description in which reference is made to the appended drawings wherein.

DETAILED DESCRIPTION

Embodiments of the present disclosure are described with reference to FIGS. 1-7. The embodiments described herein may include one or more elements or components, not illustrated in the drawings. The embodiments may be described with the limited number of elements in a certain topology by way of example only. Each element may include a structure to perform certain operations. Each element may be implemented as hardware, software, or any combination thereof. The data structures and software codes, either in its entirety or a part thereof, may be stored in a computer readable medium, which may be any device or medium that can store code and/or data for use by a computer system. Further, a computer data signal representing the software code which may be embedded in a carrier wave may be transmitted via a communication network.

In the description, the terms "loadable", "swappable", "updatable", and "renewable" may be used interchangeably. In the description, the terms "component" and "module" may be used interchangeably. In the description, the terms "programmable component" and "software component" may be used interchangeably.

The embodiments of the present disclosure provide a fine-grained mechanism for supporting software component updates, for example, for support of renewable security in the field and/or performance improvement. The granularity may be defined as software components that may be composed of a single function or any combination of multiple functions. For each renewable software component, there is the opportunity to diversify the contents, meaning that while keeping functionality constant, the structure of the software may be different upon each update, but also, functionality may optionally be variable as the component is updated. This fine-grained mechanism offers a greater flexibility of pieces which may be updated.

The base capability of renewing software components may be combined with the capability for anti-rollback, anti-roll-forward, and forced updates of components. This is achieved, for example, through mechanisms which combine cryptographic hash chains with data tables. These data tables not only contain data for the update mechanism, but also data used in the application. The combination of these multipurpose pieces of data makes the removal of the update mechanism burdensome for the attacker.

According to the embodiments of the present disclosure, single leaf-level functions of a native program may be loaded dynamically into a running program. These 'hot-swappable' program components provide the basis for updatable software components for the purpose of the implementation of security features. The mechanism for swapping program components is encapsulated in the program as static code (i.e. the base loading component) (see e.g., 102 of FIG. 1). The implementation varies per type of operating system, but applies to, for example, but not limited to, Windows, Mac OSX, Linux, Android, and iOS. The job of the base loading component is to replace a leaf-level component with a new external version. Any code in the program image, apart from the loading code, may be defined as a loadable dynamic component, as long as it can be defined as a leaf-level function. Additionally, the leaf-level characteristics may be relaxed if extended mechanisms are included in the static functionality of the program.

The loading mechanism for a native component is, for example, but not limited to, a piece of straight-line code without control-flow, with no relocatable symbols, and no references outside the scope other than the parameters and return values to the block of code. Other than the ABI convention (Application Binary Interface), this code does not need to be linked to the rest of the program. Therefore, it is possible to drop this code in place in a program dynamically, as long as there is space in the program and there are no race conditions in what the program is currently executing. Furthermore, it is possible to relax restrictions to what the code may reference if additional mechanisms are introduced that resolve these references. For example, a jump to code outside of the local code is possible as long as there is a jump table of redirections inserted. Similarly, a reference to data outside of the local code is possible as long as there is a table of address redirections inserted. This mechanism can become the equivalent to full-blown run-time dynamic linking. By putting a limit on what a loadable component is permitted to do, it allows for a high performing and efficient dynamic loading mechanism.

In a non-limiting example, the loading mechanism is applied for native applications supported by languages such as C and C++. In another non-limiting example, the loading mechanism is applied to scripting languages and web languages. For example, in scripting languages like python, TCL, and Perl, their evaluation (i.e. eval( )) capabilities form a built-in capability for dynamic updates. Additionally, web languages like Java, JavaScript, Ajax, ASP, and PHP have similar dynamic updatability while a program is running. The dynamic updatability of these scripting-type of languages may be combined with concepts in this disclosure such as anti-rollback, anti-roll-forward, forced updates, and the like to form a renewable system in whatever system context they are working. For example, an HTML5+CSS+JavaScript web system can benefit from the concepts in this invention to provide a renewable system with the dynamic updatability of JavaScript, which in turn, furnishes renewable updates to the HTML5+CSS content.

System Overview

The definition of swappable program components combined with additional concepts provides a framework for the resistance of a number of attacks. Some of these additional concepts include, for example, but not limited to:

1. The generation of diverse program components to prevent differential attacks.
2. Cryptographic hash chains to require forced updates and to prevent roll-back attacks.
3. The entanglement of hash data with application data to prevent data roll-back and roll-forward attacks.

Figure 1:
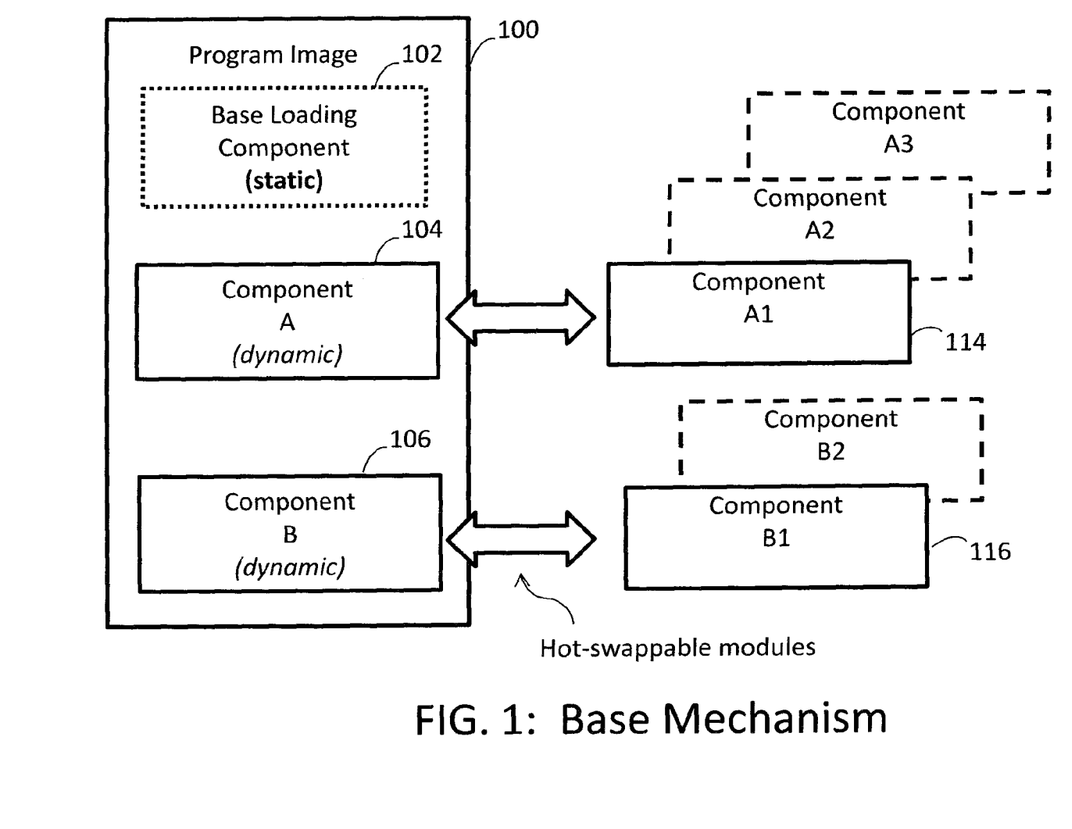
FIG. 1 depicts in a schematic diagram an example of a base mechanism for a renewable system.

One example of the basic mechanism for a renewable system is schematically illustrated in FIG. 1. The program image 102 of FIG. 1 includes a base loading component 102, and one or more dynamically loaded components 104 and 106. In a non-limiting example, the dynamically loaded components are runtime field-loadable hot-swappable, programmable components. For example, the dynamically loaded component 104 is replaceable with a new external component 114 at run-time of the program; and the dynamic component 106 is replaceable with a new external component 116 at run-time of the program. The mechanism for swapping the program components 104 and 106 is encapsulated in the program as the base loading component 102.

In a non-limiting example, the dynamically loaded components 104 and 106 are native functions arising from C, C++, assembly code, etc. In a non-limiting example, the dynamically loaded components 104 and 106 are part of scripting language, e.g., Perl python, TCL. In a non-limiting example, the dynamically loaded components 104 and 106 are part of web language, e.g., JavaScript, Java, Ajax, ASP, PHP.

In FIG. 1, two components 104 and 106 are shown for illustration purpose only. It would be appreciated by one of ordinary skill in the art that there may exist one or more than two dynamically loaded components in the program.

Figure 2:
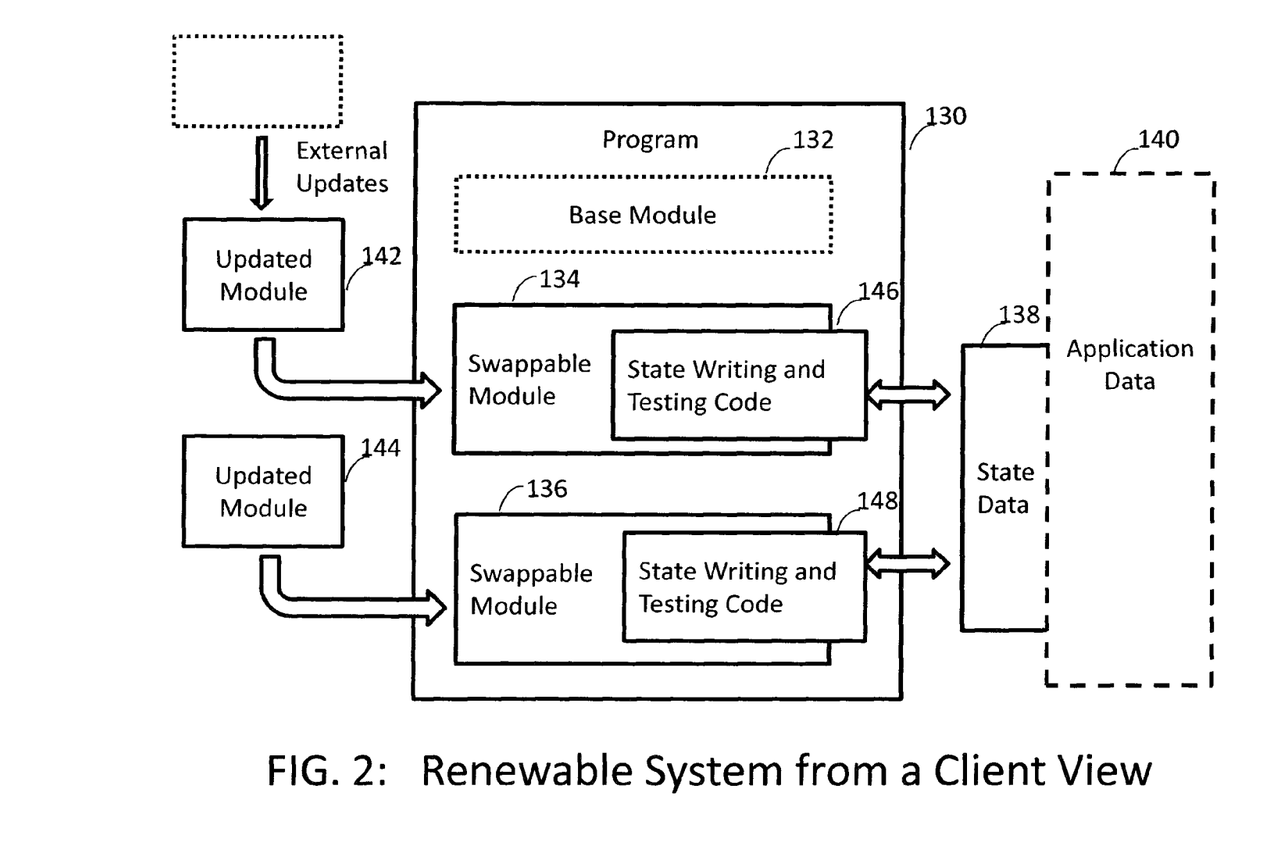
FIG. 2 depicts in a schematic diagram an example of the renewable system from a client view.

One example of the renewable system from a client view is schematically illustrated in FIG. 2. There are three parts for making up the renewable system from the client view as shown in FIG. 2:

1. The base loading component (i.e., the base component that performs the loading);
2. The one or more loaded components (i.e., the swappable component); and
3. External or internal state data (i.e., program data that may be shared between the base component and the swappable component).

In FIG. 2, the swappable module 134 in a swappable region of a program 130 is replaced with an update module 142; the swappable module 136 in a swappable region of the program 130 is replaced with an update module 144; and the base module 132 is provide for the loading. The update modules 142 and 144 may be externally updated before loading into the program.

In FIG. 2, two swappable components are shown for illustration purpose only. It would be appreciated by one of ordinary skill in the art that there may exist one or more than two swappable components in the program 130.

Figure 3:
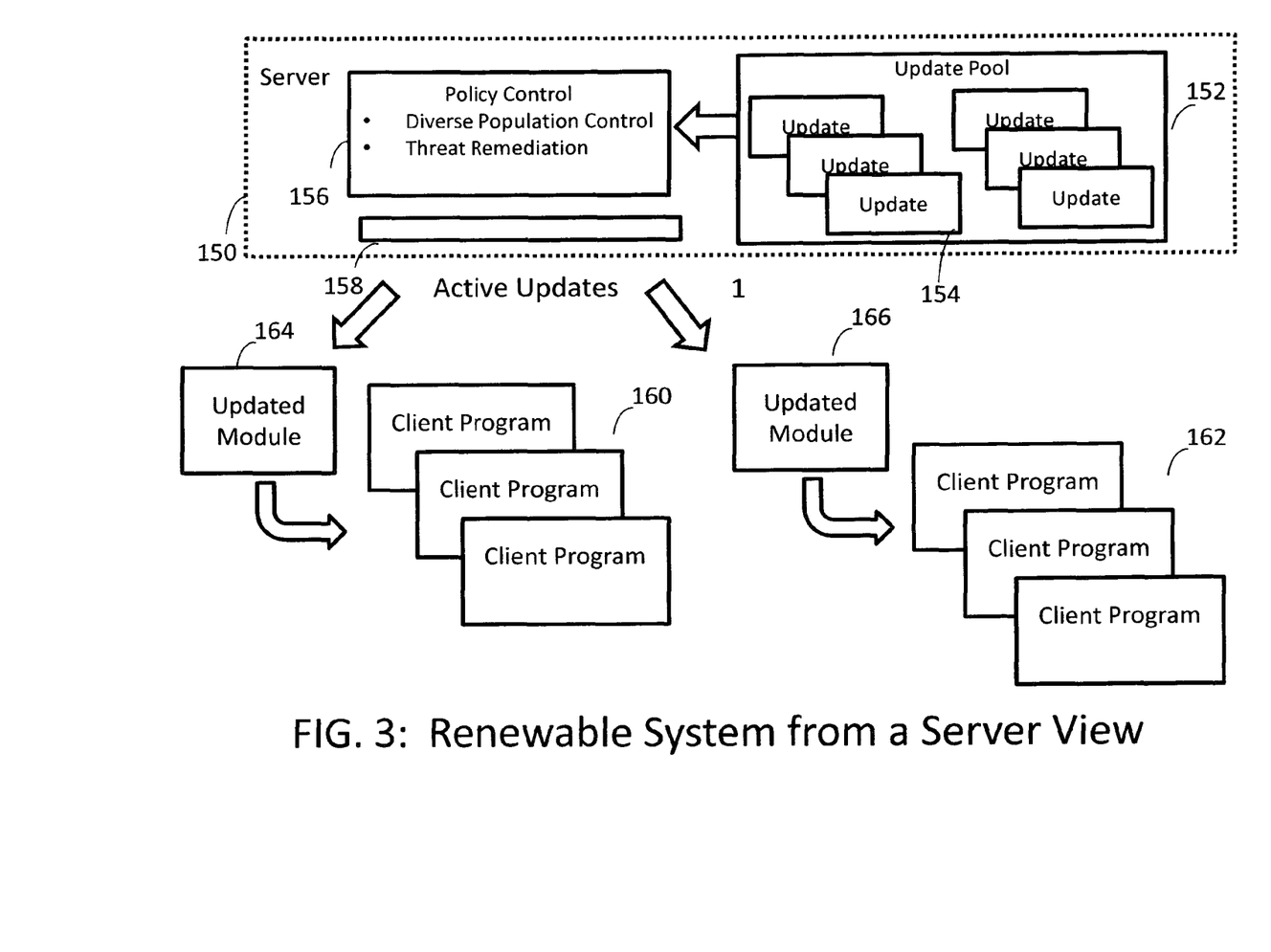
FIG. 3 depicts in a schematic diagram an example of the renewable system from a server view.

One example of the renewable system from a server view is schematically illustrated in FIG. 3. There are three parts in the server side 150 as shown in FIG. 3:
1. An update pool 152. The update pool 152 includes a set of software updates 154 that can be deployed at any request;
2. Policy control 156. The policy control 156 is the main control point for deploying software updates; and
3. A physical update mechanism 158. The system assumes connectivity to a trusted server, examples include: connection to PCs, tablets, and devices from the internet; smartphones and devices over a 3G/4G network; a cable system head-end to a set of set-top-boxes (STBs); etc.

In FIG. 3, the server 150 updates client programs 160 and 162 by using update modules 164 and 166, respectively.

Referring to FIGS. 1-3, the base mechanism for the renewable system is the ability to hot-swap software components. Software components may be swapped dynamically at run-time of the program. Known methods for blocking including mutex and semaphore mechanisms may be used to ensure that components in the midst of being swapped are not running during the swap (which could undesirably lead to a non-functioning program).

The system can include two types of dynamic loading:
1. Fully dynamic.
2. Partially dynamic In the fully dynamic loading, the system is always on-line (i.e. tethered/connected to the server). In this set-up, software update components are required to come from the server on a frequent basis and updated components are invoked immediately.

In the partially dynamic loading, the system may be off-line (i.e. not connected to the server) a percentage of the time. In this set-up, software components may be pre-loaded and remain dormant for some time until an update causes a previously loaded component to run.

These fully dynamic and partially dynamic systems have engineering trade-offs with respect to the frequency and size of the software updates. Additionally, there are trade-offs with respect to security. In some cases a partially dynamic system may be preferred over a fully dynamic system, as a designer can prepare dormant code for activation once a threat in the field has been detected.

Code used for both writing and testing state data is included in the swappable component. In FIG. 2, code 146 (148) in the swappable module 134 (136) is used for writing and testing state data 138 associating with the update. In a non-limiting example, this state data 138 contains, for example, but not limited to, cryptographic hash values computed through hash chains. The chains can run forward or backward in time and are pre-computed prior to deployment of the system. One part of the code 146 (148) in the swappable component 134 (136) is used to write hash data, which encodes the state of the update. Upon execution, the code will write this state data 138 to an undisclosed location in either internal or external storage. Additionally, a second part of the code in the swappable component will test the state data 138. If the state data 138 is in the correct configuration, the program will continue operation as normal. If the state data 138 is detected to be in an incorrect configuration, because of roll-back or roll-forward attacks, then the program will be made to behave in an abnormal operation. The type of abnormal operation is dependent on the application and context, but may include: halting operation (i.e., hard failure), slowly degrading the operation of the program (i.e. soft failure), and notifying a server of abnormal operation (i.e., call home).

The state data 138 is used for verifying correctness of the updated program. In a non-limiting example, the state data 138 is intermingled with application data 140 used for the program functionality. First, the location of the state data 138 is undisclosed and intertwined with the application data 140, such that the state data 138 may not be easily localized by an attacker. Secondly, locations for the state data 138 are dynamically allocated among locations for the application data 140, meaning that significant state data will be localized dynamically with the running of the program. Thirdly, the state data 138 is not only constant data but is created as computed data which is dependent upon values contained in the application data 140. This last measure resists attacks where state data is modified without changing application data. In effect, the state data has been propagated to include dependencies on application values used in the program 130.

Server-Side Building and Policy Control

The server side 150 of FIG. 3 to the renewable system comprises the build and deployment system. The build system for the updatable components contains tools for building diverse components as described below. Components may be pre-built and organized into sequences. Furthermore, the structure and make-up of components may be diversified according to deployment populations. For example, populations may be directed to different customer audiences, so as to reduce the ability for a 'break-once, break-everywhere' attack on the entire software population.

The policy control 156 monitors and controls how and when updates are deployed to the clients in the system. The policy control 156 determines, for example:
The length of time a client should run until a software update is required (e.g. through forced update mechanisms, described later in this document).
The specific chain of updates on which a population of clients is currently operating, and when/if the population should switch to another chain (see e.g., FIG. 6).
The granularity at which fully dynamic vs partially dynamic updates are deployed to a population as described above.

The policy control 156 can either run as a completely automated system, or be run manually or semi-automatically by a system administrator. At the very least, a system administrator monitors the run-time operation of the system through a portal that operates with the policy control 156.

Diversity

Diversity is the concept of applying a differing structure to a software component or set of software components. A differing code structure is an effective means of resisting an attacker's efforts to gain knowledge through comparisons of code. Diversity can be applied in two dimensions:
1. Differing code structure
2. Differing code functionality Both of these dimensions have merits in being applied to the renewable system.

Diversity can be applied to the base component (e.g., 102 of FIG. 1, 132 of FIG. 2) and/or the swappable components (e.g., 104 of FIG. 1, 134, 136 of FIG. 2). When applied to the base component, diversity plays a part in deployed instances. For example, a structurally different base component (using dimension 1 from above) may be created for each customer that gets the program component. This effort resists attacks that attempt to gain information from comparing programs that are owned by two or more different customers. Additionally, diversity may also be applied to major upgrades which include a deployment of the entire program image. This will resist attacks between two major versions of the initial program.

Diversity can independently be applied to the swappable/loadable software components. This can be applied spatially as different instances to different customers. As well, this can be applied temporally as each component update is provided. Furthermore, using dimension 2 as described above, functionality may be altered between instances in both the space and time dimension. The ability to change function behaviour in a swappable component can be used, for example, to alter course into a different hash chain than was previously being used. An approach like this can keep clever attackers at bay. This will be described further in the next section.

Figure 4:
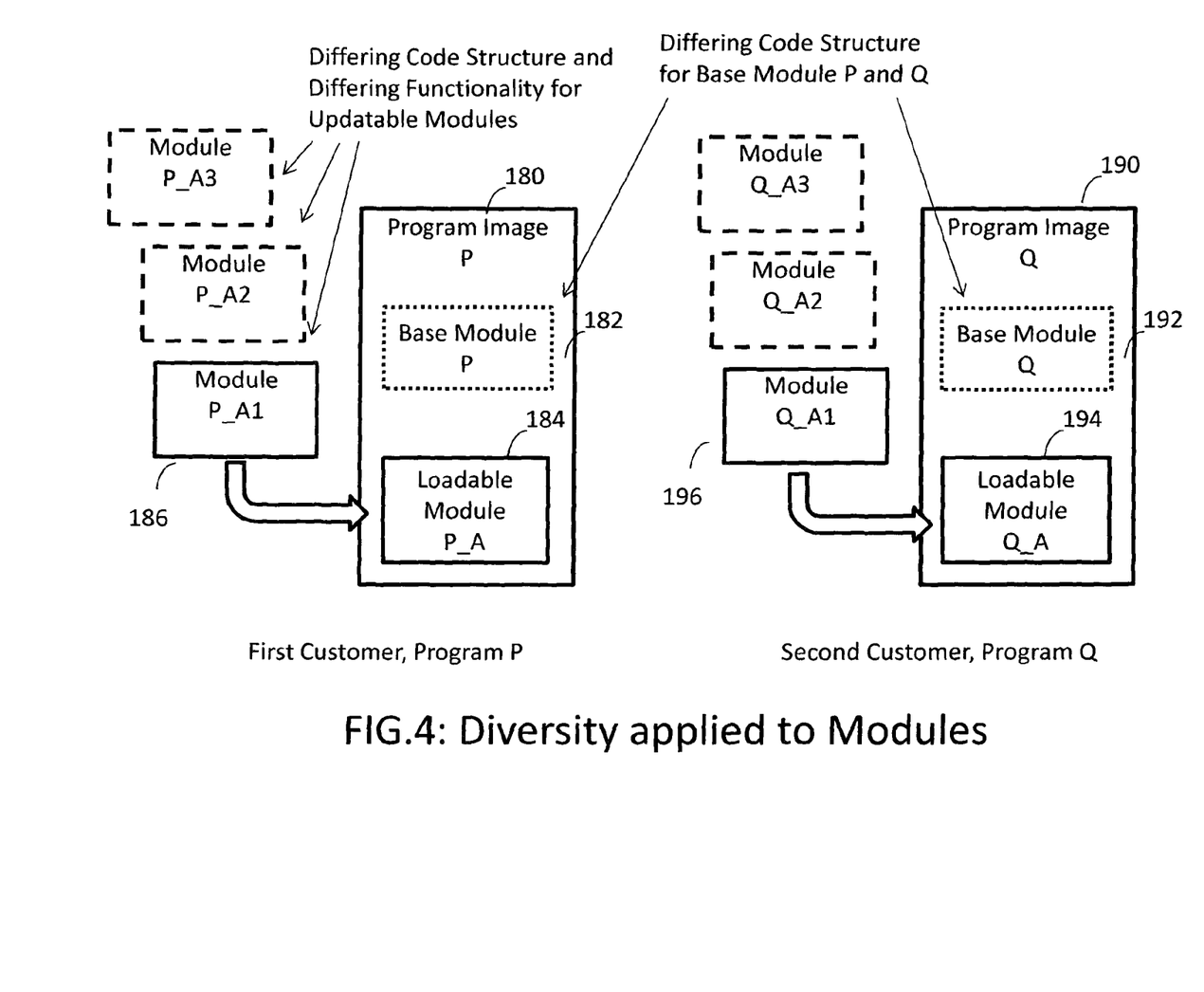
FIG. 4 depicts in a schematic diagram an example of diversity applied to based components and loadable components.

One example of diversity applied to both base components and to loadable components is schematically illustrated in FIG. 4. In FIG. 4, a program image 180 for a first customer P and a program image 190 for a second customer Q are shown for illustration purposes. A base component 182 for loading an update component 186 replacing the loadable component 184 is encapsulated in the program 180; and a base component 192 for loading an update component 196 replacing the loadable component 194 is encapsulated in the program 190. A loadable (swappable) component 184 is replaced with the update component 186; and a loadable (swappable) component 194 is replaced with the update component 196.

For the base components 182 and 192, it shows a differing code structure for instances destined for different customers P and Q. For the loadable components 184 and 194, it shows differing code structure and differing code functionality for each updatable component.

Rejection of Future and Past States (Anti-Rollback and Anti-Roll-Forward)

In a non-limiting example, the state of software update is verified by using a memory slot. Here software update is defined to set pre-defined memory slots in a memory to known values. The mechanism can be used to reject future states. Similarly, the same mechanism can be used to reject past states, so that software updates may not be skipped. Furthermore, when used in cycles, any desired sequence of software updates may be enforced and with a cycle with any predetermined period.

Figure 5:
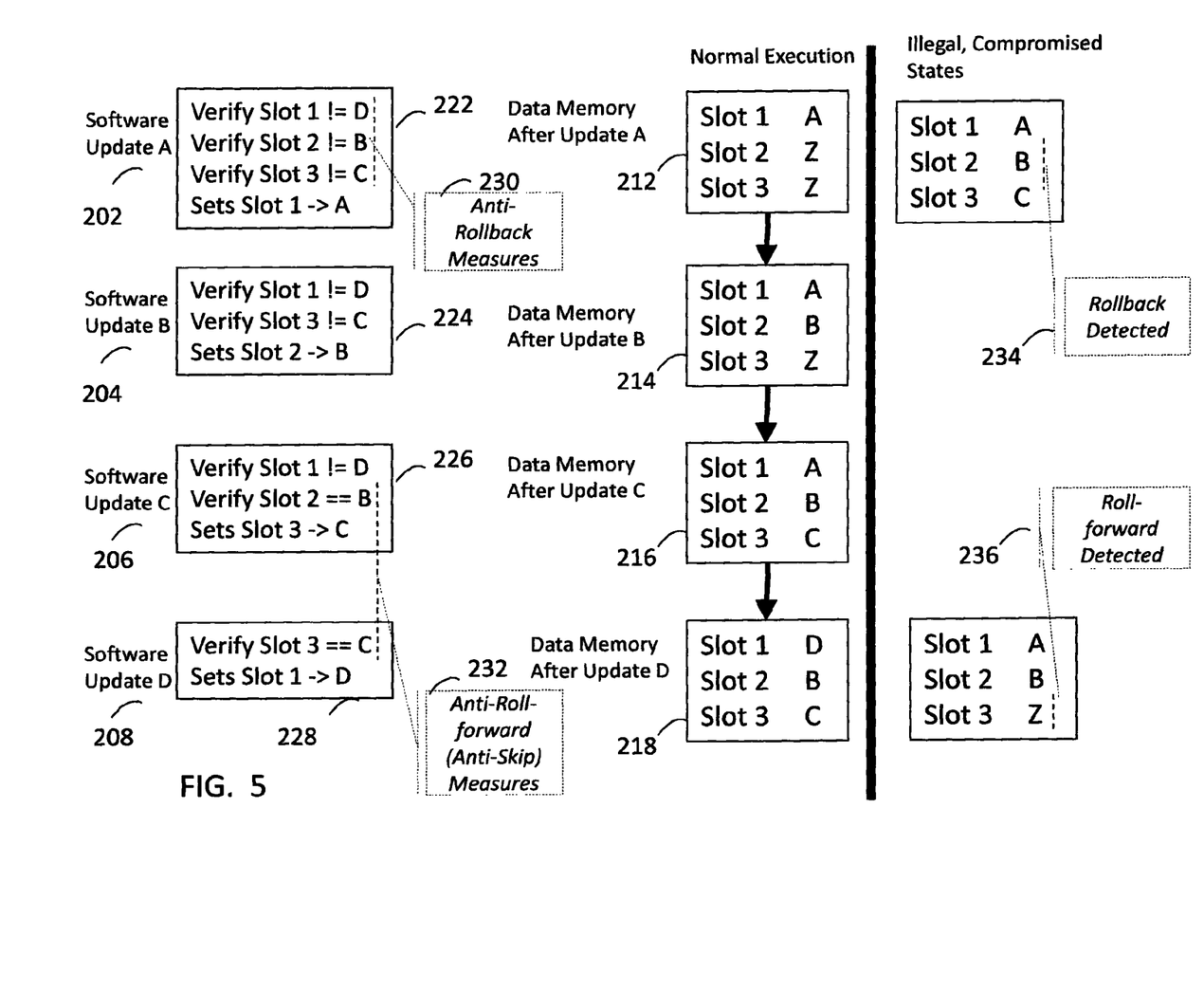
FIG. 5 depicts in a schematic diagram an example of multiple data storage slots for verifying the state of software updates.

Using multiple data storage slots to verify the state, software updates can both assign state to memory slots and verify correct state. A simplified example is shown in FIG. 5. In FIG. 5, data memory with three defined slots (slot 1, slot 2, slot 3) is shown for illustration purposes. Software updates A-D will assign state to the memory slot 1, slot 2 and slot 3 as well as verify states of the memory. In this example, software update A 202 sets slot 1 to the value A (212) when it has finished execution, software update B 204 sets slot 2 to the value B (214), software update C 206 sets slot 3 to the value C (216), and software update D 208 sets slot 1 to the value D (218). The values A-D are used as examples only. In a non-limiting example, randomly-chosen cryptographic-strength keys (e.g. 64/128-bit AES keys or SHA-2 hash values) may be used as these values.

These values A-D are chosen, for example, such that:
a) Values appear random and are indistinguishable from one another, such that there is little indication that one value may have meaning apart from another.
b) The value may serve as a cryptographic key to unlock functionality in the program.

Software updates follow a pre-defined sequence (e.g., A→B→C→D) which enables anti-rollback and anti-roll-forward measures. Anti-rollback measures 230 may verify that data memory slots have not yet attained expected values in future updates. For example, in FIG. 4, software update A verifies (222) that slot 1 does not contain the value D, because it is expected to be set until software update D. Similar verifications are made for slots 2 and 3 for software updates B and C, respectively (see 224, 226 of FIG. 5). These measures ensure that the software update has not been rolled-back independent of the data memory. The verification checks that are made may be concealed by techniques found in U.S. Pat. No. 6,842,862 and may be bound to behavior in the program by techniques found in PCT/CA2011/050157, which are incorporated herein by reference, which resist an attacker's ability to simply change the conditions based upon these checks.

Similarly, verifications 232 can be made to resist anti-roll-forward attacks so that software updates are not skipped. For example, in FIG. 5, software update C verifies (226) that slot 2 contains the value B to determine that software update B 204 has not been skipped. Software update D 208 does the same type of verification on slot 3 (228) to determine that software update C 206 has not been by-passed. For example, if slot 2 contains B and slot 3 contains C after software update A 202, rollback is detected 234; if no value is assigned to slot 3 after software update C, roll-forward is detected 236.

The verification checks 232 may be concealed and bound to the program by techniques in U.S. Pat. No. 6,842,862 and PCD/CA2011/050157. Alternatively, the values of B or C can be chosen as encryption keys that unlock necessary data or functionality. Also, the ability to cryptographically unlock data may be concealed in the code of an update by using an existing symmetric or asymmetric algorithm with a slight variation. For example, if a white-box implementation of an AES algorithm is varied slightly (e.g. with independent round-keys and with data transformations at the boundaries, as in U.S. Pat. No. 6,842,862) and this code is contained in a software update, then it is the only this update that is able to use predetermined key in the data memory. This method allows the software update to be locked to a key in a slot in memory.

In FIG. 5, three slots for four software updates are illustrated for illustration purposes only. It would be appreciated by one of ordinary skill in the art that this technique can be expanded to any number of memory slots for any number of software updates. The ratio of the number of memory slots to the number of software updates may be flexibly chosen as 1 to 1, or 1 to N (i.e., many), where the trade-off is the amount of memory needed versus the fine granularity of rollback or roll-forward detection that may be achieved. On the other hand, choosing N>1 may aid the purpose of concealing the intent of the memory locations over time as software upgrades are deployed. In addition to a 1 to N mapping, the mapping need not be fixed for the lifetime of the program. This mapping can dynamically change, which may further resist attacks on the mechanics of the system.

Furthermore the anti-rollback and anti-roll-forward mechanisms shown by example may be used interchangeably by cycling patterns in the update system. The chain of updates may contain cycles of any cardinal chosen period greater than 1. In addition, any number of repeating cycles and cycles within cycles may be used and augmented in a dynamic fashion. This flexibility offers the ability to renew security to the field over time.

Forced Updates using Computed Chains

Figure 6:
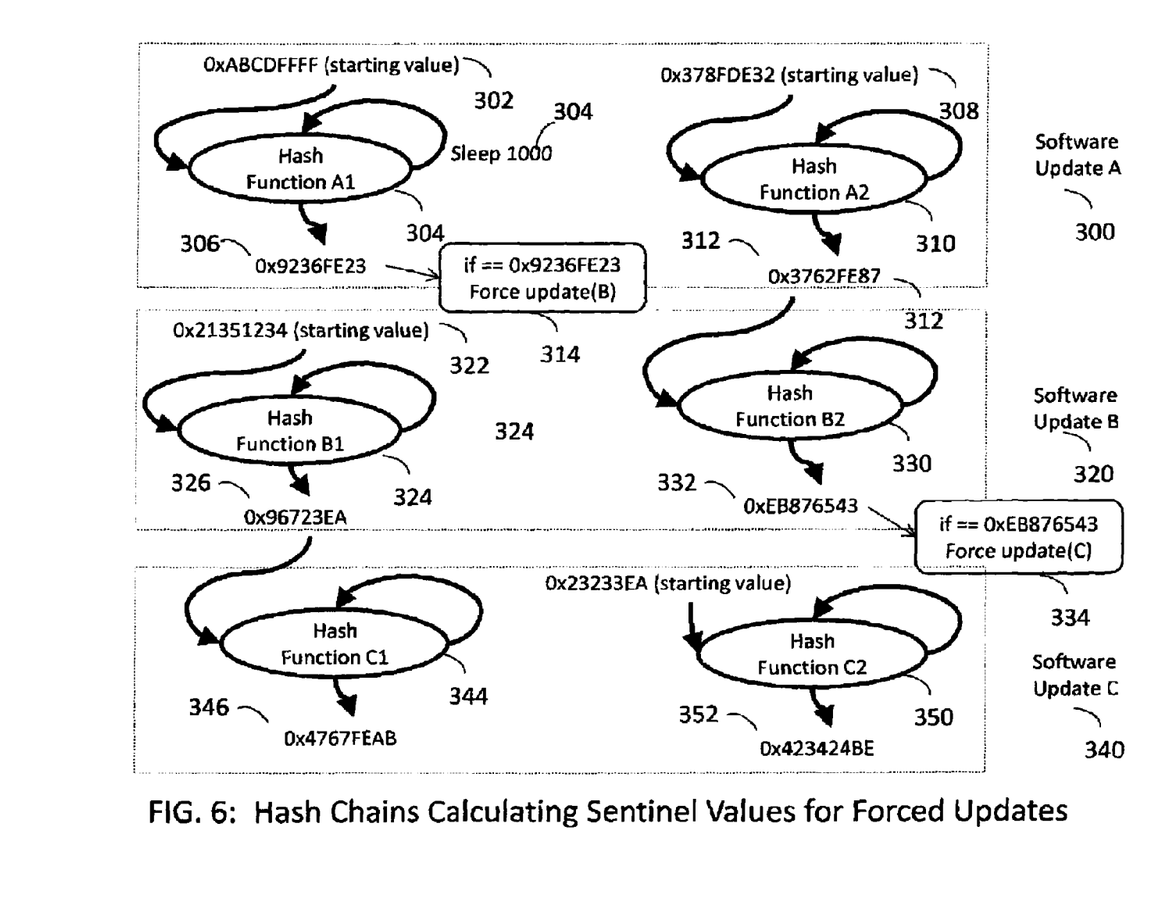
FIG. 6 depicts in a schematic diagram a hash chains calculation for forced updates.

In a non-limiting example, cryptographic hash chains are used for forced updates. A hash function used for forced updates may be a standard hashing function (e.g. SHA-1, SHA-2, MD-5), or any custom variation of a hash function, or an entirely home-grown hashing function. When used in a chained fashion, a starting data value is run through the function, which in turn becomes the input to the next link in the chain. This periodic system can be made to cycle quickly or slowly at any desired timing, simply by separating the cyclic hash functions by other useful (i.e., application) calculations. FIG. 6 depicts these cycles starting from a randomly chosen starting value which may be embedded into the software update. "Sleep 1000" represents a delay inserted into the chaining calculation. Any delay can be inserted into the chaining calculations.

For the software update A 300 of FIG. 6, a starting data value 302 is run through the hash function A1 304; and a starting data value 308 is run through the hash function A2 310. For the software update B 320 of FIG. 6, a starting data value 322 is run through the hash function B1 324; and the hash chain value 312 derived from the hash function A2 310 is run through the hash function B2 330. For the software update C 340 of FIG. 6, the hash chain value 326 derived from the hash function B1 324 is run through the hash function C1 344; and a starting data values 342 is run through the hash function C2 350. In FIG. 6, if the hash value 306 is a predetermined sentinel value (e.g., "0x9236FF23"), then software update B is invoked (314), and also if the hash value 332 is a predetermined sentinel value (e.g., "0xEB876543"), then software update C is invoked (334).

The predetermined sentinel values can be calculated off-line and embedded in the software, so that when the sentinel value is identified it causes an event which forces a software update to occur (314, 334). For example, a software component may be created that allows no more than 1000 invocations. This may be achieved by placing hash function chain at the beginning of the component and embedding the 1000th sentinel hash value (e.g., from an off-line calculation) in the update. When the software component reaches its 1000th invocation, it invokes a forced software update. The forcing behaviour can be achieved in any number of ways, of which examples include:

- Corruption of essential data to functionality of the program, which can continue only when a software update is invoked.
- Deletion of an encryption key that allows essential functionality which will not continue unless a software update is invoked.
- Invocation of an exception handler which communicates to a privileged process (i.e. Ring 0, kernel mode driver) that halts execution of the application until a software update is invoked.

The sentinel values do not need to be protected as the actual values have no embedded meaning; however, in a non-limiting example, the behaviour of code using sentinel values for the purpose of invoking a forced update is concealed from any potential attacker. This program code can be concealed through tamper-resistance and obfuscation techniques such as those described in U.S. Pat. No. 6,842,862. Additionally, any measures that increase the ambiguity of the association of program behaviour with sets of data values (including the sentinel value) will necessarily pose a barrier to an attacker. For example, the sentinel value can be part of a large table whose values trigger calls to a large set of possible functions, one of which causes a forced update.

The sentinel values and hash chains may be used as a complement to the previously described rollback and roll-forward detection by using memory slots. For example, instead of checking for a specific value in a memory slot for an immediate behaviour, a chained hash of values may be cycled through to finally trigger a rollback or roll-forward detection behaviour.

The above methods can be augmented with additional control methodologies. The methods can be applied for single updates and single update chains. The methods can be augmented into collective behaviors, where multiple updates and multiple update chains react and function together. For example, one forced update may cause two out of three interdependent update chains to react, while leaving one chain to work on a different period.

Another example is the ability to create order dependencies of software component updates. With the policy control 156 of FIG. 3, one can create a predetermined order to a sub-chain of updatable software components. For example, a chain of 5 software updates can be made mandatory, without any skipping of updates. The above mechanisms permit the ability to detect any break to the order, which can indicate an attack. Here the mechanisms can be used as a check over the integrity of the system, and a policy can be created over what is permitted. This is a security check over which a remediation can take place.

As another example, policies that are pushed down from the policy control 156 of FIG. 3 portion of the server can produce a necessary policy interlocking. One example is a policy that requires the base component to be updated in addition to a set of swappable components.

The capabilities of forced updates, as well as anti-rollback and anti-roll-forward features, offers the ability for a software system to have more control over the updates. It would be appreciated by one of ordinary skill in the art that the updates described above can be not only for the purpose of security, but also for the purpose of performance improvements, the addition of features, bug fixes, etc. Control over the timing and the triggers for software updates is a useful utility for the long-term maintenance of any software system, which is especially important in a connected system environment.

Entanglement of State Data with Application Data

In a non-limiting example, the use of internal data (i.e., state data, such as 138 of FIG. 2) may be intermingled with application data through a well-defined API, such that random choices of memory slots prevent an attacker from distinguishing the intended use of the data. For example, an application uses memory to store data related to the application (e.g. user information, program states, etc.), while the hash data is used to enforce the state of the software update system. If an attacker is unable to distinguish these two intentions, then he may undesirably change application data when trying to undermine the software update system. This intermingling and entanglement of data raises the difficulty of an attacker to alter the update mechanisms without undesirable side-effects which are tied to the correct function of the application. Furthermore, state data can be made dependent upon application data, such that an attack including copying of state data without the relevant application data will be ineffective.

Figure 7:
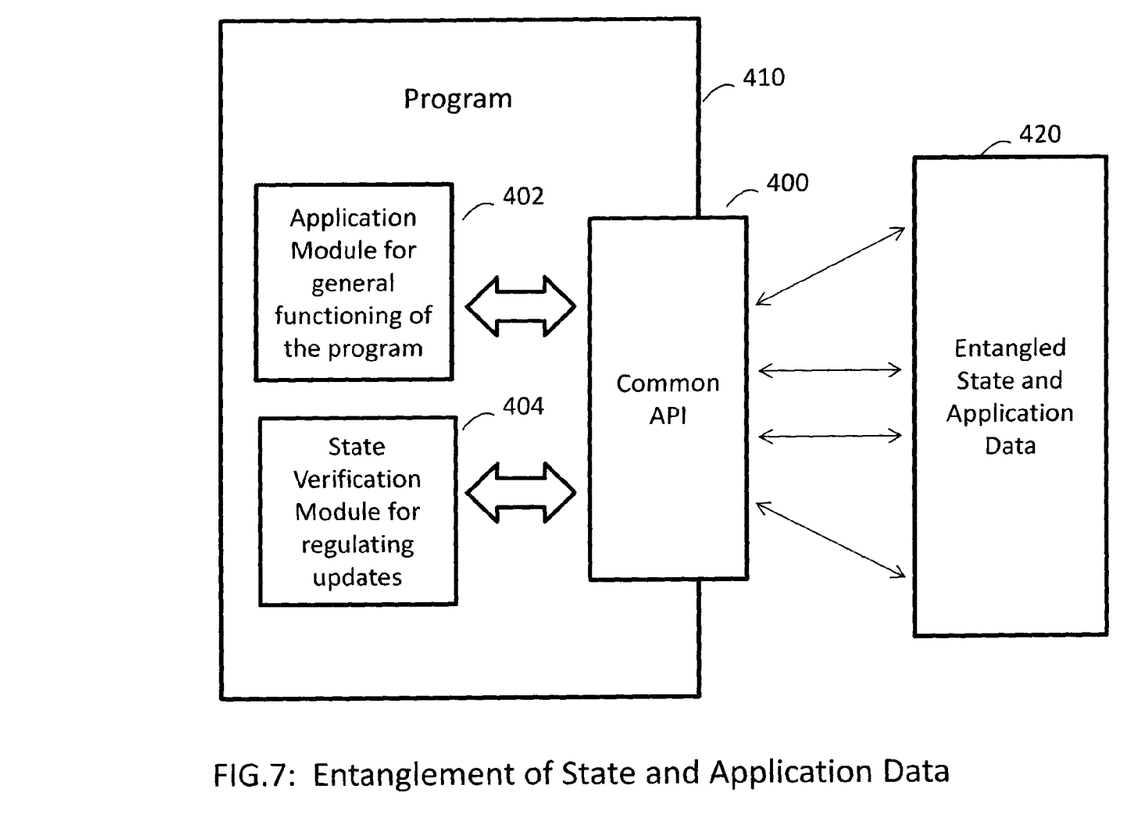
FIG. 7 depicts in a schematic diagram an example of entangling state data with application data.

FIG. 7 depicts an overview of the concept of entangling state data with application data. A common API (Application Program Interface) 400 is designed so that application 402 code and state verification 404 code in program 410 can interact with data 420 in a common way. The common API 400 converts accesses to the data (i.e. reads, writes, and modifications of the data) to similar accesses, but controls the following characteristics:

Location of the data: both static location and dynamic location of data.

Duplication of data: the API module determines whether or not there are duplicate locations for the same data and which locations are 'live' (i.e. in use).

Splitting of data into sub-locations.

Dependencies between data: the API component determines how and when state data is dependent on other state data, and how and when state data is dependent on application data.

Data for the purposes of state or application may be located throughout the area for storage in either a static sense or a dynamic sense. In a static sense, data resides for the lifetime of the program in a constant location. In a dynamic sense, data may reside at different locations depending on where the program is in its lifetime.

Duplication of data is method of creating decoys or diversions for an attacker. For example, state data which is used to verify the current state of an update may be duplicated among 2 or more physical locations in storage. Then, the program can dynamically decide to count on only one (or more) of these locations and create decoy data in the other locations. As the attacker does not know which locations are legitimate, he will be led astray from the real state data. Further to this, the program can be made to dynamically rely on different locations as the program runs on. This will leave the attacker guessing as to which and when state data locations are legitimate.

Splitting of data includes the creation of multiple locations for one piece of data. The sub-pieces which create the final state data may be distributed into disjoint locations, combined with other unrelated data, and/or duplicated as well. The common API for accessing the data controls how the data is recombined in both a static and dynamic sense. The manner in which the data is recombined can vary depending on point in the program during its lifetime.

Dependencies between state/state data and state/application data may be achieved through techniques found in PCT/CA2011/050157. Dependencies can be created for either constant or variable data, consisting of data carriers and data bindings into the program. Adverse changes to the data without an understanding of the dependencies can cause the program to malfunction.

In addition to this common data access API, a compilation tool can be used to analyse and intermingle the code in the data access API with application and state handling code. This is in an effort to automate some or all of the steps described above.

As an added measure to state data, the software now has the ability to collect telemetry data. For example, as states are tracked by updates, it is also possible to track states that are not permitted by a policy. We can define states that are prohibited outright and disallow the software to continue (as described earlier); however, on the other hand if we consider these states as discouraged then we can create policies that count the number of discouraged states as telemetry data. This telemetry data can then be sent back to the server periodically, where the Policy Control (e.g., 156 of FIG. 3) can take actions to remediate the situation. For example, if the number of discouraged states passes a certain threshold for a particular customer, then the Policy Control can decide to increase the rate of pro-active update renewals on this customer.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

One or more currently preferred embodiments have been described by way of example. It will be apparent to persons skilled in the art that a number of variations and modifications can be made without departing from the scope of the invention as defined in the claims.

What is claimed is:

1. A method executed by one or more computing devices for software renewal, comprising:

loading, by at least one of the one or more computing devices, a software component into at least one loadable region of a program by a base component in the program to update the program, wherein the software component is dynamically swapped at run-time of the program in accordance with an update schedule;

writing, by at least one of the one or more computing devices, state data encoding the state of the updated program in a storage upon execution of the software component, wherein the state data comprises a sequence of values corresponding to a sequence of updates applied to the program;

entangling, by at least one of the one or more computing devices, the state data with application data corresponding to a functionality of the program;

testing, by at least one of the one or more computing devices, the state data to verify a condition of the updated program by comparing one or more values in the sequence of values with one or more values in a predetermined sequence of values corresponding to a correct sequence of updates for the program; and detecting, by at least one of the one or more computing devices, one or more of: a roll-back condition or a roll-forward condition based on the testing.

2. A method according to claim 1, further comprising:

operating, by at least one of the one or more computing devices, the program in an abnormal operation if it is determined by the testing that the one or more values in the sequence of values is different from the one or more values in the predetermined sequence of values.

3. A method according to claim 1, further comprising:

deploying, by at least one of the one or more computing devices, the software component, wherein deploying the software component is based on at least one of:

a length of time the program has run;

a chain of previous updates; or granularity of the update schedule.

4. A method according to claim 1, wherein loading the software component comprises:
   replacing a current software component loaded in the at least one loadable region of the program with a new software component, wherein the new software component has one or more of: a different code structure or a different code functionality than the current software component.

5. A method according to claim 1, further comprising at least one of:
   providing, by at least one of the one or more computing devices, the software component to each customer such that the software component for a first customer has one or more of: a different code structure or a different code functionality from that of a second customer; or
   providing, by at least one of the one or more computing devices, the base component to each customer such that the base component for the first customer has a different code structure from that of the second customer.

6. A method according to claim 1, further comprising:
   loading, by at least one of the one or more computing devices, the software component into the program in a fully dynamic manner or a partially dynamic manner.

7. A method according to claim 1, wherein the sequence of values corresponding to the sequence of updates applied to the program comprises a first cryptographic hash chain, and wherein the predetermined sequence of values corresponding to the correct sequence of updates for the program comprises a second cryptographic hash chain pre-computed prior to deployment of the software component, and further comprising:
   invoking, by at least one of the one or more computing devices, a forced update to the program when a current hash value of the first cryptographic hash chain reaches a predetermined value.

8. A method according to claim 7, further comprising:
   concealing, by at least one of the one or more computing devices, code for the invoking of the forced update.

9. A method according to claim 7, wherein the predetermined value is in a part of a table containing data used in the program.

10. A method according to claim 7, wherein the first cryptographic hash chain is generated by inputting a hash value derived by executing a hash function for a first software component loaded in the at least one loadable region of the program as a starting value of a hash calculation for a second software component loaded in the at least one loadable region of the program.

11. A method according to claim 7, further comprising:
    inserting, by at least one of the one or more computing devices, a delay into a calculation for the first cryptographic hash chain.

12. A method according to claim 1, wherein a memory slot is allocated for each update, and wherein a state is assigned to the memory slot for each update.

13. A method according to claim 12, wherein the memory slot is randomly selected for each update.

14. A method according to claim 12, wherein assigning comprises assigning a random value or a cryptographic key to the memory slot.

15. A method according to claim 14, wherein the cryptographic key is configured to unlock a functionality in the program.

16. A method according to claim 1, wherein entangling the state data with the application data corresponding to the functionality of the program comprises one or more of:
    dynamically allocating a location for the state data among locations for the application data;
    duplicating the state data in multiple memory locations;
    splitting the state data among multiple memory locations; or
    creating dependencies between the state data and the application data.

17. A method according to claim 1, wherein the software component comprises:
    one or more leaf-level functions;
    a part of a native program; or
    a part of a scripting language or a web language.

18. An apparatus for software renewal, the apparatus comprising:
    one or more processors; and
    one or more memories operatively coupled to at least one of the one or more processors and having instructions stored thereon that, when executed by at least one of the one or more processors, cause at least one of the one or more processors to:
        load a software component into at least one loadable region of a program by a base component in the program to update the program, wherein the software component is dynamically swapped at run-time of the program in accordance with an update schedule;
        write state data encoding the state of the updated program in a storage upon execution of the software component, wherein the state data comprises a sequence of values corresponding to a sequence of updates applied to the program;
        entangle the state data with application data corresponding to a functionality of the program;
        test the state data to verify a condition of the updated program by comparing one or more values in the sequence of values with one or more values in a predetermined sequence of values corresponding to a correct sequence of updates for the program; and
        detect one or more of: a roll-back condition or a roll-forward condition based on the testing.

19. The apparatus of claim 18, wherein at least one of the one or more memories has further instructions stored thereon that, when executed by at least one of the one or more processors, cause at least one of the one or more processors to:
    operate the program in an abnormal operation if it is determined by the testing that the one or more values in the sequence of values is different from the one or more values in the predetermined sequence of values.

20. The apparatus of claim 18, wherein at least one of the one or more memories has further instructions stored thereon that, when executed by at least one of the one or more processors, cause at least one of the one or more processors to:
    deploy the software component, wherein deploying the software component is based on at least one of:
    a length of time the program has run;
    a chain of previous updates; or
    granularity of the update schedule.

21. The apparatus of claim 18, wherein the instructions that, when executed by at least one of the one or more processors, cause at least one of the one or more processors to load the software component further cause at least one of the one or more processors to:
    replace a current software component loaded in the at least one loadable region of the program with a new software component, wherein the new software component has one or more of: a different code structure or a different code functionality than the current software component.

22. The apparatus of claim 18, wherein at least one of the one or more memories has further instructions stored thereon that, when executed by at least one of the one or more processors, cause at least one of the one or more processors to:
provide the software component to each customer such that the software component for a first customer has one or more of: a different code structure or a different code functionality from that of a second customer; or
provide the base component to each customer such that the base component for the first customer has a different code structure from that of the second customer.

23. The apparatus of claim 18, wherein at least one of the one or more memories has further instructions stored thereon that, when executed by at least one of the one or more processors, cause at least one of the one or more processors to:
load the software component into the program in a fully dynamic manner or a partially dynamic manner.

24. The apparatus of claim 18, wherein the sequence of values corresponding to the sequence of updates applied to the program comprises a first cryptographic hash chain, wherein the predetermined sequence of values corresponding to the correct sequence of updates for the program comprises a second cryptographic hash chain pre-computed prior to deployment of the software component, and wherein at least one of the one or more memories has further instructions stored thereon that, when executed by at least one of the one or more processors, cause at least one of the one or more processors to:
invoke a forced update to the program when a current hash value of the first cryptographic hash chain reaches a predetermined value.

25. The apparatus of claim 24, wherein at least one of the one or more memories has further instructions stored thereon that, when executed by at least one of the one or more processors, cause at least one of the one or more processors to:
conceal code for the invoking of the forced update.

26. The apparatus of claim 24, wherein the predetermined value is in a part of a table containing data used in the program.

27. The apparatus of claim 24, wherein the first cryptographic hash chain is generated by inputting a hash value derived by executing a hash function for a first software component loaded in the at least one loadable region of the program as a starting value of a hash calculation for a second software component loaded in the at least one loadable region of the program.

28. The apparatus of claim 24, wherein at least one of the one or more memories has further instructions stored thereon that, when executed by at least one of the one or more processors, cause at least one of the one or more processors to:
insert a delay into a calculation for the first cryptographic hash chain.

29. The apparatus of claim 18, wherein a memory slot is allocated for each update, and wherein a state is assigned to the memory slot for each update.

30. The apparatus of claim 29, wherein the memory slot is randomly selected for each update.

31. The apparatus of claim 29, wherein assigning comprises assigning a random value or a cryptographic key to the memory slot.

32. The apparatus of claim 31, wherein the cryptographic key is configured to unlock a functionality in the program.

33. The apparatus of claim 18, wherein the instructions that, when executed by at least one of the one or more processors, cause at least one of the one or more processors to entangle the state data with the application data corresponding to the functionality of the program further cause at least one of the one or more processors to perform one or more of:
dynamically allocating a location for the state data among locations for the application data;
duplicating the state data in multiple memory locations;
splitting the state data among multiple memory locations; or
creating dependencies between the state data and the application data.

34. The apparatus of claim 18, wherein the software component comprises:
one or more leaf-level functions;
a part of a native program; or
a part of a scripting language or a web language.

35. At least one non-transitory computer-readable medium storing computer-readable instructions that, when executed by at least one of one or more computing devices, cause at least one of the one or more computing devices to:
load a software component into at least one loadable region of a program by a base component in the program to update the program, wherein the software component is dynamically swapped at run-time of the program in accordance with an update schedule;
write state data encoding the state of the updated program in a storage upon execution of the software component, wherein the state data comprises a sequence of values corresponding to a sequence of updates applied to the program;
entangle the state data with application data corresponding to a functionality of the program;
test the state data to verify a condition of the updated program by comparing one or more values in the sequence of values with one or more values in a predetermined sequence of values corresponding to a correct sequence of updates for the program; and
detect one or more of: a roll-back condition or a roll-forward condition based on the testing.

36. The at least one non-transitory computer-readable medium of claim 35, further storing computer-readable instructions that, when executed by at least one of the one or more computing devices, cause at least one of the one or more computing devices to:
operate the program in an abnormal operation if it is determined by the testing that the one or more values in the sequence of values is different from the one or more values in the predetermined sequence of values.

37. The at least one non-transitory computer-readable medium of claim 35, further storing computer-readable instructions that, when executed by at least one of the one or more computing devices, cause at least one of the one or more computing devices to:
deploy the software component, wherein deploying the software component is based on at least one of:
a length of time the program has run;
a chain of previous updates; or
granularity of the update schedule.

38. The at least one non-transitory computer-readable medium of claim 35, wherein the instructions that, when executed by at least one of the one or more computing devices, cause at least one of the one or more computing devices to load the software component further cause at least one of the one or more computing devices to:

replace a current software component loaded in the at least one loadable region of the program with a new software component, wherein the new software component has one or more of: a different code structure or a different code functionality than the current software component.

39. The at least one non-transitory computer-readable medium of claim 35, further storing computer-readable instructions that, when executed by at least one of the one or more computing devices, cause at least one of the one or more computing devices to:

provide the software component to each customer such that the software component for a first customer has one or more of: a different code structure or a different code functionality from that of a second customer; or provide the base component to each customer such that the base component for the first customer has a different code structure from that of the second customer.

40. The at least one non-transitory computer-readable medium of claim 35, further storing computer-readable instructions that, when executed by at least one of the one or more computing devices, cause at least one of the one or more computing devices to:

load the software component into the program in a fully dynamic manner or a partially dynamic manner.

41. The at least one non-transitory computer-readable medium of claim 35, wherein the sequence of values corresponding to the sequence of updates applied to the program comprises a first cryptographic hash chain, and wherein the predetermined sequence of values corresponding to the correct sequence of updates for the program comprises a second cryptographic hash chain pre-computed prior to deployment of the software component, and further storing computer-readable instructions that, when executed by at least one of the one or more computing devices, cause at least one of the one or more computing devices to:

invoke a forced update to the program when a current hash value of the first cryptographic hash chain reaches a predetermined value.

42. The at least one non-transitory computer-readable medium of claim 41, further storing computer-readable instructions that, when executed by at least one of the one or more computing devices, cause at least one of the one or more computing devices to:

conceal code for the invoking of the forced update.

43. The at least one non-transitory computer-readable medium of claim 41, wherein the predetermined value is in a part of a table containing data used in the program.

44. The at least one non-transitory computer-readable medium of claim 41, wherein the first cryptographic hash chain is generated by inputting a hash value derived by executing a hash function for a first software component loaded in the at least one loadable region of the program as a starting value of a hash calculation for a second software component loaded in the at least one loadable region of the program.

45. The at least one non-transitory computer-readable medium of claim 41, further storing computer-readable instructions that, when executed by at least one of the one or more computing devices, cause at least one of the one or more computing devices to:

insert a delay into a calculation for the first cryptographic hash chain.

46. The at least one non-transitory computer-readable medium of claim 35, wherein a memory slot is allocated for each update, and wherein a state is assigned to the memory slot for each update.

47. The at least one non-transitory computer-readable medium of claim 46, wherein the memory slot is randomly selected for each update.

48. The at least one non-transitory computer-readable medium of claim 46, wherein assigning comprises assigning a random value or a cryptographic key to the memory slot.

49. The at least one non-transitory computer-readable medium of claim 48, wherein the cryptographic key is configured to unlock a functionality in the program.

50. The at least one non-transitory computer-readable medium of claim 35, wherein the instructions that, when executed by at least one of the one or more computing devices, cause at least one of the one or more computing devices to entangle the state data with the application data corresponding to the functionality of the program further cause at least one of the one or more computing devices to perform one or more of:

dynamically allocating a location for the state data among locations for the application data;

duplicating the state data in multiple memory locations;

splitting the state data among multiple memory locations; or creating dependencies between the state data and the application data.

51. The at least one non-transitory computer-readable medium of claim 35, wherein the software component comprises:

one or more leaf-level functions;

a part of a native program; or a part of a scripting language or a web language.

* * * * *